Patented Apr. 20, 1937

2,077,960

UNITED STATES PATENT OFFICE 2,077,960

NICOTINE DERIVATIVES

Robert L. Sibley, Nitro, W. Va., assignor, by mesne assignments, to Monsanto Chemical Company, St. Louis, Mo., a corporation of Delaware No Drawing. Application June 29, 1934, Serial No. 733,117

18 Claims. (Cl. 260—25)

The present invention relates broadly to nicotine-thiazole reaction products and more particularly relates to chemical products obtainable by reacting nicotine and an aryl thiazole of the formula

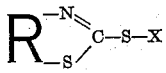

where R is an aromatic radical and X is hydrogen or the group

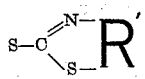

R' being an aromatic radical.

The preferred compounds of the present invention have not heretofore been described in the literature, but are readily obtainable by comparatively cheap and simple method of preparation.

One object of the present invention then is to provide a new class of chemical compounds which, particularly by virtue of their solubility in ketonic solvents, are of marked commercial importance, and may be employed as insecticidal preparations.

Another object of the present invention is to provide a cheap and relatively simple method of manufacture of the new class of materials.

As examples of the new class of materials included within the scope of the present invention are reaction products of nicotine with the following materials: 2-mercapto-benzo-thiazole, 2-mercapto 6-phenyl-benzo-thiazole, 2-mercapto 6-methyl-benzo-thiazole, 2-mercapto 6-nitro-benzo-thiazole, mercapto-xylyl-thiazole, mercapto-naphtho-thiazole and their corresponding disulfids respectively, as for example dibenzo-thiazyl-disulfid, ditolyl-thiazyl-disulfid and the like.

The following examples are given as specific embodiments of the present invention and are not to be understood as limitative of the scope thereof.

Example I 324 parts by weight of nicotine having a purity of 80% (substantially 1.6 mols) and 280 parts by weight of 2-mercapto-benzo-thiazole having a purity of 95% (substantially 1.6 mols) were placed in a suitable reactor and heated at a convenient temperature, for example 90° C. to 100° C. until reaction was completed, whereupon a clear brown liquid reaction product was produced. The compound so obtained, which is believed to be the nicotine salt of 2-mercapto-benzo-thiazole, is readily soluble in acetone, alcohol and ether and slightly soluble in benzene.

Example II 20 parts by weight of nicotine having a purity of 80% (substantially 0.1 mol.) and 24.3 parts by weight of 2-mercapto 6-phenyl-benzo-thiazole (0.1 mol.) were reacted by heating at a temperature of substantially 95° C. to 100° C., whereupon a viscous dark brown liquid reaction product was obtained which is very soluble in acetone, slightly soluble in benzene and substantially insoluble in alcohol and ether. The product so obtained is believed to be the nicotine salt of 2-mercapto 6-phenyl-benzo-thiazole.

Although the products specifically obtained in Examples I and II hereinbefore described are believed to be nicotine salts, it is to be understood the present invention is not limited to salts and their method of preparation. Reaction products other than salts of nicotine and an aryl thiazole of the formula

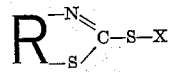

where R is an aromatic radical and X is hydrogen or the group

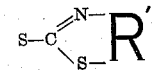

where R' is an aromatic radical, and their method of preparation likewise falls within the scope of the present invention. Thus a further example follows.

Example III 33 parts by weight of dibenzo-thiazyl-disulfid (substantially 0.1 mol.) and 32 parts by weight of nicotine (substantially 0.2 mol.) were heated at a temperature of substantially 100° C. to 110° C., whereupon a thick brown liquid reaction product resulted which was found to be very soluble in acetone and alcohol, slightly soluble in benzene and substantially insoluble in ether.

In the specific examples hereinbefore set forth reaction temperatures of substantially 90° C. to 110° C. were specified. The reaction temperature is not confined to these limits but may be widely varied. Furthermore, if convenient or desirable an anhydrous organic solvent may be employed in manufacturing the new materials. Again nicotine having a purity of other than 80% has been employed in the manufacture of the new class of compounds. It is preferable, however, that it be substantially anhydrous.

What is claimed is:

1. A product obtained by reacting in the presence of heat, nicotine and an aryl thiazole of the formula

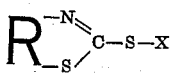

where R is an aromatic radical of the benzene and naphthalene series and X is a member of the class consisting of hydrogen and the group

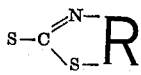

R' being an aromatic radical of the benzene and naphthalene series, said reactants being employed in the ratio of substantially one molecular proportion of the thiazole compound to $n$ molecular proportions of nicotine, where $n$ equals the number of

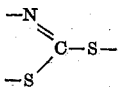

groups in the thiazole compound.

2. A product obtained by reacting in the presence of heat nicotine and a mercapto-aryl-thiazole of the benzene and naphthalene series, said reactants being employed in the ratio of substantially one molecular proportion of the thiazole compound to $n$ molecular proportions of nicotine, where $n$ equals the number of

groups in the thiazole compound.

3. A product obtained by reacting in the presence of heat nicotine and a mercapto-benzo-thiazole, said reactants being employed in the ratio of substantially one molecular proportion of the thiazole compound to $n$ molecular proportions of nicotine, where $n$ equals the number of

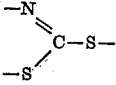

groups in the thiazole compound.

4. A product obtained by reacting in the presence of heat substantially equi-molecular proportions of nicotine and a mercapto-aryl-thiazole of the benzene and naphthalene series.

5. A product obtained by reacting in the presence of heat substantially equi-molecular proportions of nicotine and a mercapto-benzo-thiazole.

6. A product obtained by reacting in the presence of heat substantially equi-molecular proportions of nicotine and mercapto-benzo-thiazole.

7. A product obtained by reacting in the presence of heat substantially equi-molecular proportions of nicotine and 2-mercapto 6-phenyl-benzo-thiazole.

8. A product obtained by reacting in the presence of heat substantially one molecular proportion of dibenzo-thiazyl-disulfid and substantially two molecular proportions of nicotine.

9. A process of preparing a nicotine-thiazole reaction product comprising reacting in the presence of heat, nicotine and an aryl thiazole of the structural formula

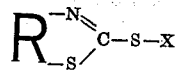

where R is an aromatic radical of the benzene and naphthalene series and X is a member of a class consisting of hydrogen and the group

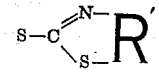

R' being an aromatic radical of the benzene and naphthalene series.

10. A process of preparing a nicotine-thiazole reaction product comprising reacting in the presence of heat nicotine and a mercapto-aryl-thiazole of the benzene and naphthalene series.

11. A process of preparing a nicotine-thiazole reaction product comprising reacting in the presence of heat nicotine and a mercapto-benzo-thiazole.

12. A process of preparing a nicotine-thiazole reaction product comprising reacting in the presence of heat nicotine and mercapto-benzo-thiazole.

13. A process of preparing a nicotine-thiazole reaction product comprising heating substantially equi-molecular proportions of nicotine and a mercapto-aryl-thiazole of the benzene and naphthalene series.

14. A process of preparing a nicotine-thiazole reaction product comprising heating substantially equi-molecular proportions of nicotine and a mercapto-benzo-thiazole.

15. A process of preparing a nicotine-thiazole reaction product comprising heating substantially equi-molecular proportions of nicotine and mercapto-benzo-thiazole.

16. A process of preparing a nicotine-thiazole reaction product comprising heating substantially equi-molecular proportions of nicotine and mercapto-benzo-thiazole at a temperature of substantially 90° C. to 100° C.

17. A process of preparing a nicotine-thiazole reaction product comprising heating substantially equi-molecular proportions of nicotine and 2-mercapto 6-phenyl-benzo-thiazole at a temperature of substantially 95° C. to 100° C.

18. A process of preparing a nicotine-thiazole reaction product comprising heating substantially one molecular proportion of dibenzo-thiazyl-disulfid and substantially two molecular proportions of nicotine at a temperature of substantially 100° C. to 110° C.

ROBERT L. SIBLEY.